(12) United States Patent
Kaplan

(10) Patent No.: US 6,396,906 B1
(45) Date of Patent: *May 28, 2002

(54) TELEPHONE ANSWERING SYSTEM THAT AUTOMATICALLY CALLS BACK A CALLER WHO HAS LEFT A MESSAGE

(75) Inventor: Alan Edward Kaplan, Morris Township Morris County, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/937,948

(22) Filed: Sep. 25, 1997

(51) Int. Cl.[7] .......................... H04M 1/64; H04M 11/00
(52) U.S. Cl. ................ 379/67.1; 379/88.04; 379/88.11; 379/88.21; 379/88.25; 379/209
(58) Field of Search .......................... 379/67.1, 68, 69, 379/70, 72, 74, 81, 88.01, 88.03, 88.04, 88.11, 88.16, 88.18, 88.21, 88.23, 88.25, 88.28, 209, 142, 214, 218

(56) References Cited

U.S. PATENT DOCUMENTS

| 5,289,530 | A | * | 2/1994 | Reese .......................... 379/88 |
| 5,341,414 | A | * | 8/1994 | Popke .......................... 379/142 |
| 5,502,761 | A | * | 3/1996 | Duncan et al. ............. 379/142 |
| 5,504,805 | A | * | 4/1996 | Lee ............................. 379/67.1 |
| 5,625,682 | A | * | 4/1997 | Gray et al. .................. 379/266 |
| 5,740,229 | A | * | 4/1998 | Hanson et al. ............. 379/67.1 |
| 5,799,060 | A | * | 8/1998 | Kennedy et al. .............. 379/29 |
| 5,926,524 | A | * | 7/1999 | Taylor ..................... 379/88.08 |
| 6,067,349 | A | * | 5/2000 | Suder et al. ............. 379/88.19 |

OTHER PUBLICATIONS

Prior art Dialog search results including abstracts of JP 2046052 (Publication), GB 2296840, CA 2137952, GB 2285369, JP 1106660 (Publication), JP 63–187755 (Publication), JP 62–012254 (Publication).

* cited by examiner

Primary Examiner—Binh Tieu

(57) ABSTRACT

A telephone answering system that automatically dials a specified telephone number left by a caller in conjunction with a message left for a message recipient. The caller is given an option to leave such a number. In the case the caller has left such a number, the message recipient is given an option to have that number automatically dialed. If the message recipient chooses that option, the number as specified by the caller is automatically dialed, and the connection between the telephone line of the message recipient and the telephone answering system is terminated. The present invention thus provides great convenience to subscribers of telephone answering systems when calling back previous callers who have left messages.

22 Claims, 2 Drawing Sheets

TELEPHONE ANSWERING SYSTEM THAT AUTOMATICALLY CALLS BACK A CALLER WHO HAS LEFT A MESSAGE

TECHNICAL FIELD

This invention relates to telephone answering systems, and more particularly, to a telephone answering system that automatically calls back a caller at a telephone number specified by the caller in conjunction with a message left by the caller.

BACKGROUND OF THE INVENTION

Typical telephone answering systems in the prior art do not automatically call back a caller at a telephone number that the caller has specified in conjunction with a message left by the caller. However, such a telephone answering system would be greatly convenient to both the caller and the message recipient.

Prior art caller ID may store the telephone numbers of previous callers, and may give the user an option to automatically call back one of the stored telephone numbers of a previous caller. However, the caller ID number is determined automatically by the telephone central office. This feature is disadvantageous because the caller ID number determined by the telephone central office is only the billing telephone number.

Thus, where a caller is calling from a large organization having a main number with numerous extensions, the telephone central office may only determine the main number without the specific extension of the caller. For example, many large companies have an easy to remember main number with the last four digits ending in a thousand, such as (321) 456-1000. Then each person working within such a large company has a more specific extension as the last four digits of the phone number, such as (321) 456-7891. However, the caller ID feature may only store the number (321) 456-1000 because most of the PBX (Private Branch Exchange) trunks typically use this main number as the billing telephone number. Automatically dialing back this main number may create confusion for the message recipient who later attempts to connect with the caller.

An even more disadvantageous feature of automatically dialing back the caller ID number is that only the billing telephone number which is typically the number the caller has called from is stored. Thus, if the caller wants to be reached at a different telephone number from that called from, then the different telephone number cannot be automatically dialed. Such a situation can easily arise with mobile callers such as businessmen and salesmen who are calling from "on the road" such as from airports. In addition, although a caller may be calling from his or her work number, the caller may desire to be called back later at home.

Thus, a telephone answering system is desired where the phone number as specified by a caller can be automatically dialed back, in conjunction with a message left by the caller.

SUMMARY OF THE INVENTION

Accordingly, as a primary object of the present invention, a telephone answering system automatically dials back a phone number that a caller has specified in conjunction with a message left by the caller.

In a general aspect of the present invention, a telephone answering system includes an instruction synthesizer for instructing the caller to enter a phone number where the caller wishes to be reached by a message recipient. A memory stores this specified phone number along with a corresponding message that the caller leaves for the message recipient. A control circuit terminates the connection of the telephone answering system to the message recipient's telephone line. A control interface controls one of a PBX (Private Branch Exchange) of the message recipient or a CENTREX within the telephone central office to connect the message recipient's telephone line to the caller by automatically dialing the specified phone number.

The present invention can be used to particular advantage when the caller is given an option of leaving a specified number. The caller may choose not to leave a number. In the case the caller chooses to leave a number, the caller can enter in the specified number using either a DTMF (Dual Tone Multi-Frequency) keypad or by voice. If the caller leaves the specified number by voice, the present invention further comprises a voice-recognition unit that converts the spoken phone number into a digital data format for storage into memory. If the caller enters DTMF (Dual Tone Multi-Frequency) tones, the present invention further comprises a DTMF recognition unit that converts the DTMF tones into a digital data format.

In another aspect of the present invention, the message recipient is given an option of having the specified number of the caller automatically dialed. The message recipient may choose not to have the specified number of the caller automatically dialed or may choose to dial a different number.

These and other features and advantages of the present invention will be better understood by considering the following detailed description of the invention which is presented with the attached drawings.

DETAILED DESCRIPTION

Figure 1:
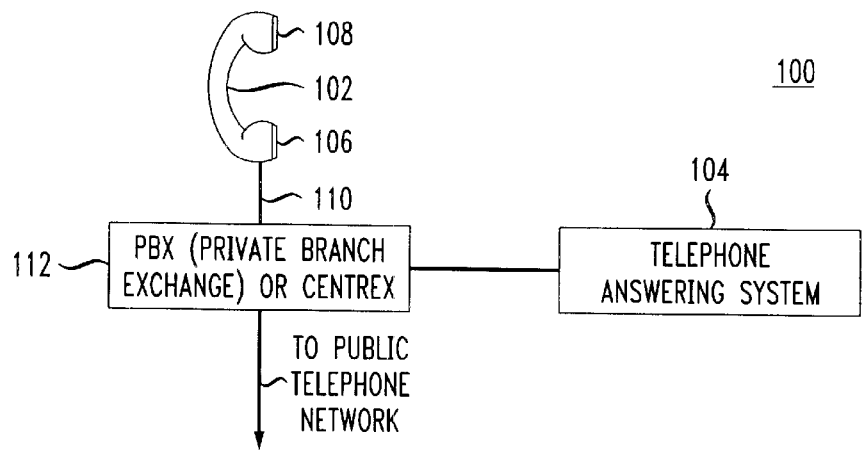
FIG. 1 shows a telephone answering system subscribed to by a message recipient within a telephone network.

Referring to FIG. 1, a telephone network 100 includes a telephone 102 of a user who subscribes to a telephone answering system 104. Such a user is the message recipient of any messages left by a caller on the telephone answering system. The telephone includes a telephone transmitter (microphone) 106 into which the user speaks and a telephone receiver (earpiece) 108 from which the user listens. The telephone is coupled via a telephone line 110 to a CENTREX of a telephone central office 112 or to a PBX (Private Branch Exchange) which connects the telephone to the telephone answering system and to the rest of the public telephone network.

The typical operation of the telephone answering system 104 such as a voice mail system are commonly known since such answering systems are now widely used. A caller can leave a message for a message recipient when the message recipient is not available to take a call on the telephone line 110.

Figure 2:
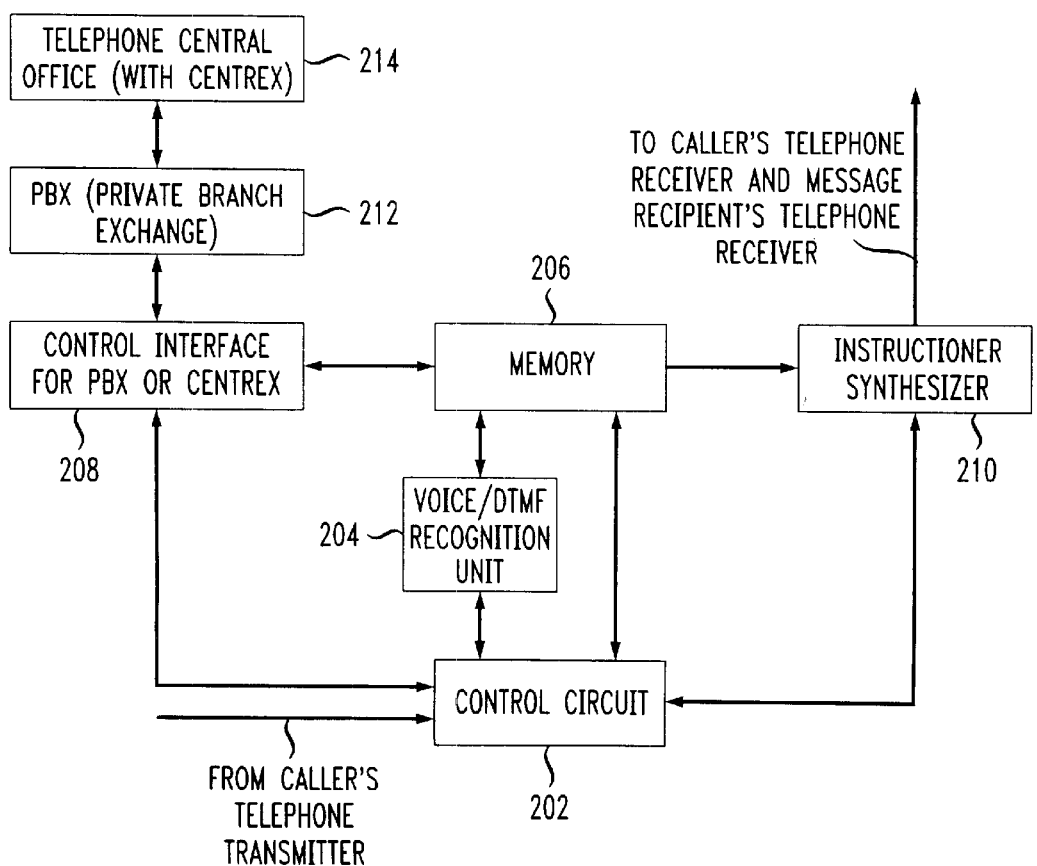
FIG. 2 shows components of a telephone answering system according to a preferred embodiment of the present invention.

The present invention enhances the operation of the telephone answering system by automatically dialing back a number as specified by the caller who has left a message. Referring to FIG. 2, the components that carry out this enhanced feature of the telephone answering system of the present invention are shown. Such a telephone answering system 200 includes a control circuit 202 coupled to a caller's telephone transmitter. The control circuit is coupled to a voice/DTMF (Dual Tone Multi-Frequency) recognition unit 204 and to a memory 206. The control circuit is also coupled to control interface 208 and to an instruction synthesizer 210. The control interface is coupled to a PBX (Private Branch Exchange) 212 which is coupled to a telephone central office 214. The telephone central office 214 includes a CENTREX switching network. The PBX and the telephone central office are not part of the telephone answering system 200 of the present invention. The instruction synthesizer is coupled to the caller's telephone receiver and the message recipient's telephone receiver.

Figure 3:
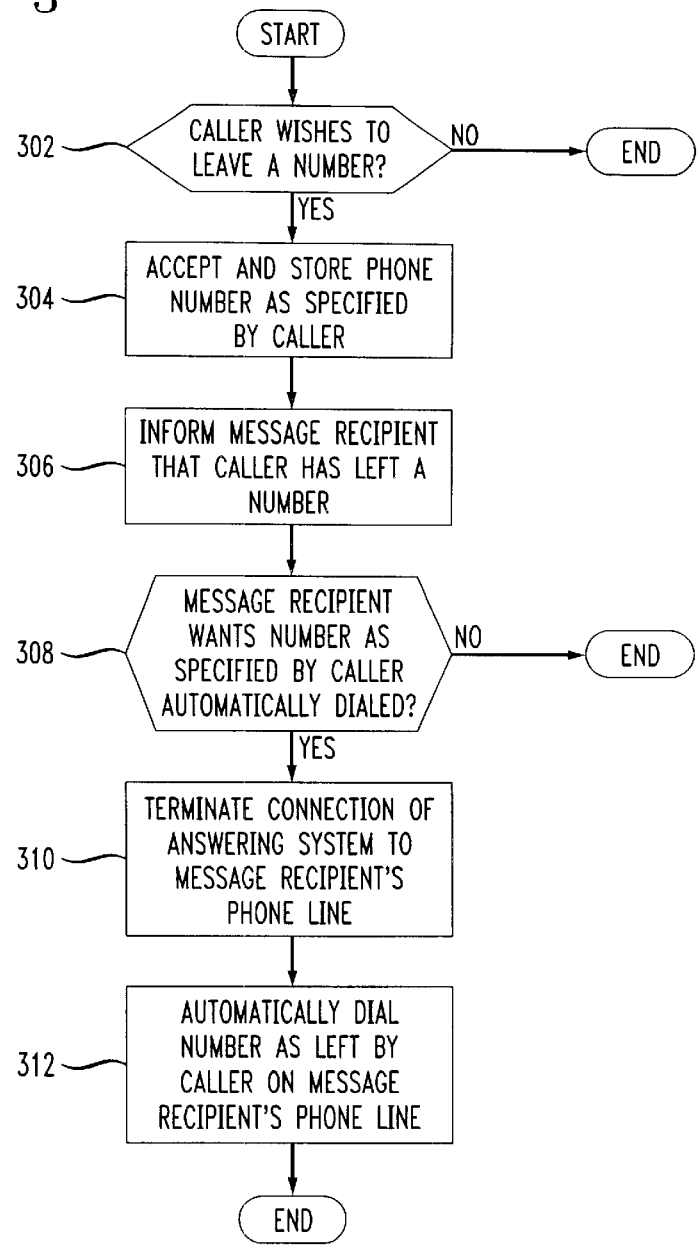
FIG. 3 shows a flowchart of the steps of operation of the telephone answering system according to a preferred embodiment of the present invention.

The operation of the telephone answering system 200 according to a preferred embodiment of the present invention is now described with reference to the flowchart of FIG. 3. Referring to FIGS. 1–3, operation of the present invention begins when a caller calls a message recipient at the telephone line 110 who is not available to take the call. The telephone answering system 200 takes a message from the caller for the message recipient and gives an option to the caller to specify a number where the caller wishes to be reached (step 302 of FIG. 3). The caller can choose to not leave a number, and in that case, the telephone answering system takes only a message from the caller and resumes operation of a conventional telephone answering system.

In the case the caller chooses to specify a phone number where the caller wishes to be reached, the caller is instructed by the instruction synthesizer 210 via the caller's telephone speaker to either enter such a number by a DTMF (Dual Tone Multi-Frequency) keypad or by voice. The control circuit 202 accepts such a number entered by the caller and stores this information into memory 206 (step 304 of FIG. 3).

If the caller enters the phone number by voice, the spoken number is first coupled through the voice recognition unit 204 which converts the spoken number into a digital data format to be stored in memory 206. If the caller enters the phone number via a DTMF keypad, such a DTMF signal is first coupled through the DTMF recognition unit 204 which converts the DTMF tone into a digital data format to be stored in memory 206. Alternatively, if a caller chooses to not leave a specified phone number, a caller ID number may be stored into the memory 206 by default.

Alternatively, the telephone central office 214 may include an ANI (Automatic Number Identification) unit that determines the billing telephone number of the caller which typically is the phone number the caller is calling from. The ANI-determined number is also the calling number that is sent by the caller ID feature. The instruction synthesizer 210 may inform the caller of this ANI-determined telephone number and may give the caller the option of automatically storing this billing telephone number. With this feature, the caller does not have to enter a telephone number if the billing telephone number is desired by the caller to be the specified phone number.

Figure 4:
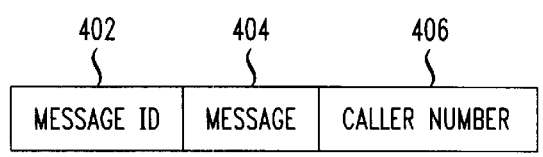
FIG. 4. shows example data fields within the memory component of FIG. 2.

In this manner, when a caller leaves a message and a specified phone number for the message recipient, a data structure 400 of FIG. 4 may be used in the memory 206. This data structure includes three fields with a first data field 402 containing a message identification number, a second data field 404 containing the caller's message, and a third data field 406 containing the phone number the caller has entered.

The operation of the telephone answering system of the present invention continues when the message recipient has dialed into the telephone answering system, such as a voice mail system, and is listening to the messages left for the recipient. For any particular message, the message recipient is informed by the instruction synthesizer 210 if a caller who has left that message has also left a phone number where the caller wishes to be reached (step 306 of FIG. 3). If a phone number has been left, the message recipient is given an option to have the enhanced telephone answering system control the PBX or the CENTREX to automatically dial that number from the recipient's telephone line (step 308 of FIG. 3).

In choosing such an option, the message recipient may be notified of the phone number stored in the third data field 406. The message recipient may be notified by a display screen that shows the specified phone number or by voice generation of the specified phone number to be automatically dialed.

After such notification of the specified phone number, if the message recipient chooses to not call back the caller, the telephone answering system resumes operation of a conventional telephone answering system. Alternatively, the message recipient may be informed of the phone number stored in the third data field 406 in the memory 206, and the message recipient may choose to dial a number that is different from that phone number stored in memory 206.

If the message recipient after listening to the caller's message chooses to have the specific phone number of the caller automatically dialed, the control circuit 202 terminates connection of the telephone answering system to the message recipient's telephone line 110 (step 310 of FIG. 3). Then, the control interface 208 retrieves that number from memory 206. The control interface 208 controls the PBX 212 or the CENTREX 214 to automatically dial that number from the recipient's telephone line 110 and to connect the message recipient's telephone line 110 to the caller's specified telephone number (step 312 of FIG. 3). The termination from the answering system allows a two party connection between the message recipient and the caller after automatic dialing of the caller's specified phone number.

In this manner, the telephone answering system of the present invention provides great convenience to the message recipient by automatically dialing the number as specified by the caller. After the message recipient has listened to the message left by a caller, the message recipient may be automatically connected with the number that the caller has indicated. Thus, in contrast to the prior art, the message recipient does not have to write down the number that a caller may leave and does not have to then dial that number.

Moreover, the present invention provides great convenience to the caller by providing the freedom for the caller to specify the number where that caller can be reached. Thus, in contrast to automatic dial back features with caller ID, the caller has control over which number the telephone answering system automatically dials back.

The forgoing is by way of example only and is not intended to be limiting. For example, the advantageous features of the present invention may be used in conjunction with other known features of the conventional telephone answering system. Thus, the message recipient may have a caller's message and number stored and may retrieve that message and number at a later time that is convenient to the recipient. The invention is limited only as defined in the following claims and equivalents thereof.

I claim:

1. A method for automatically calling back a caller who has left a message on a telephone answering system for a message recipient, said method including the steps of:
   A. instructing said caller to enter a phone number where said caller wishes to be reached by said message recipient;
   B. storing said phone number with said message of said caller;
   C. terminating connection of said telephone answering system to said message recipient's telephone line; and
   D. automatically dialing said phone number of said caller from a telephone line of said message recipient in response only to a telephone call from said recipient.

2. The method of claim 1, further including the step of:
   giving an option to said caller to not leave any phone number with said message and not performing steps A–D if said caller takes said option.

3. The method of claim 2, further including the step of:
   informing said message recipient that said caller can be automatically called back if said caller has left said phone number.

4. The method of claim 3, further including the step of:
   informing said message recipient of said phone number left by said caller.

5. The method of claim 1, further including the steps of:
   informing the caller of an ANI (Automatic Number Identification) determined billing telephone number; and
   giving an option to said caller to select said billing telephone number as said phone number stored in step B.

6. The method of claim 1, further including the step of:
   giving an option to said message recipient to not call back said caller and not performing steps C–D if said message recipient takes said option.

7. The method of claim 6, further including the step of:
   giving an option to said message recipient to dial a number that is different from said phone number left by said caller.

8. The method of claim 1, wherein step A includes the step of:
   instructing said caller to enter said phone number by one of (1) dialing in said phone number via a DTMF (Dual Tone Multi-Frequency) keypad and (2) speaking said phone number.

9. The method of claim 8, further including the step of:
   converting any spoken phone number into a digital data format using a voice recognition unit.

10. The method of claim 8, further including the step of:
    converting a DTMF (Dual Tone Multi-Frequency) tone into a digital data format using a DTMF (Dual Tone Multi-Frequency) recognition unit.

11. The method of claim 1, wherein said telephone answering system is a voice mail system.

12. A method for automatically calling back a caller who has left a message on a telephone answering system for a message recipient, said method including the steps of:
    A. instructing said caller to enter a phone number where said caller wishes to be reached by said message recipient, wherein said step A includes the steps of:
       instructing said caller to enter said phone number by one of (1) dialing in said phone number via a DTMF (Dual Tone Multi-Frequency) keypad and (2) speaking said phone number;
       converting any spoken phone number into a digital data format; and
       converting any entered DTMF (Dual Tone Multi-Frequency) tone into a digital data format;
    B. giving an option to said caller to not leave any phone number with said message of said caller and not performing any of subsequent steps C–E if said caller takes said option;
    C. storing said phone number with said message of said caller;
    D. in response only to a call from said message recipient, informing said message recipient that said caller can be automatically called back if said caller bas left said phone number;
    E. giving an option to said message recipient to not call back said caller, and,
    if said message recipient takes said option:
       informing said message recipient of said phone number left by said caller, and
       giving an option to said message recipient to dial a number that is different from said phone number left by said caller, and
    if said message recipient does not take said option,
       terminating connection of said telephone answering system to said message recipient's telephone line, and
       automatically dialing said phone number of said caller from a telephone line of said message recipient.

13. The method of claim 12, wherein said telephone answering system is a voice mail system.

14. A telephone answering system that automatically calls back a caller who has left a message for a message recipient, said answering system comprising:
    an instruction synthesizer for instructing said caller to enter a phone number where said caller wishes to be reached by said message recipient;
    a memory for storing said phone number with said message of said caller;
    a control circuit for terminating connection of said telephone answering system to said message recipient's telephone line; and
    a PBX (Private Branch Exchange) control interface for controlling a PBX (Private Branch Exchange), coupled to said message recipient's telephone line, to automatically dial said phone number of said caller from a telephone line of said message recipient in response only to a telephone call from said message recipient.

15. The telephone answering system of claim 14, wherein said control circuit gives said caller an option to not leave any phone number with said message of said caller, and wherein said control circuit informs said message recipient that said caller has left said phone number that may be automatically dialed.

16. The telephone answering system of claim 14, wherein said control circuit gives said message recipient an option to not call back said caller at said phone number.

17. The telephone answering system of claim 14, wherein said instruction synthesizer instructs said caller to enter said phone number by voice, and wherein said telephone answering system further comprises:
    a voice recognition unit for converting any spoken phone number into a digital data format.

18. The telephone answering system of claim 14, wherein said instruction synthesizer instructs said caller to enter said phone number via a DTMF (Dual Tone Multi-Frequency)

keypad, and wherein said telephone answering system further comprises:
  a DTMF (Dual Tone Multi-Frequency) recognition unit for converting any entered DTMF (Dual Tone Multi-Frequency) tone into a digital data format.

19. A telephone answering system that automatically calls back a caller who has left a message for a message recipient, said answering system comprising:
  an instruction synthesizer for instructing said caller to enter a phone number where said caller wishes to be reached by said message recipient, wherein said instruction synthesizer instructs said caller to enter said phone number by one of voice and a DTMF (Dual Tone Multi-Frequency) keypad;
  a voice recognition unit for converting any spoken phone number into a digital data format;
  a DTMF (Dual Tone Multi-Frequency) recognition unit for converting any entered DTMF (Dual Tone Multi-frequency) tone into a digital data format;
  a memory for storing said phone number with said message of said caller;
  a control circuit for terminating connection of said telephone answering system to said message recipient's telephone line, wherein said control circuit gives said caller an option to not leave any phone number with said message of said caller, and wherein said control circuit, in response only to a telephone call from said message recipient, informs said message recipient that said caller has left said phone number, and wherein said control circuit gives said message recipient an option to not call back said caller; and
  a PBX (Private Branch Exchange) control interface for controlling a PBX (Private Branch Exchange), coupled to said message recipient's telephone line, to automatically dial said phone number of said caller from said message recipient's telephone line.

20. A telephone answering system that automatically calls back a caller who has left a message for a message recipient, said answering system comprising:
  a means for obtaining and storing a phone number where said caller wishes to be reached by said message recipient;
  a control circuit for terminating connection of said telephone answering system to a telephone line of said message recipient; and
  a means for automatically dialing said phone number of said caller from a telephone line of said message recipient in response only to a telephone call from said message recipient.

21. The telephone answering system of claim 20, wherein said means for obtaining and storing instructs said caller to enter said phone number by voice, and wherein said telephone answering system further comprises:
  a voice recognition unit for converting any spoken phone number into a digital data format.

22. The telephone answering system of claim 20, wherein said means for obtaining and storing instructs said caller to enter said phone number via a DTMF (Dual Tone Multi-Frequency) keypad, and wherein said telephone answering system further comprises:
  a DTMF (Dual Tone Multi-Frequency) recognition unit for converting any entered DTMF tone into a digital data format.

* * * * *